United States Patent
Otto et al.

(10) Patent No.: US 8,846,561 B2
(45) Date of Patent: Sep. 30, 2014

(54) CATALYST FOR THE PRODUCTION OF POLYESTER, USE OF THE CATALYST FOR THE PRODUCTION OF POLYESTER, AND POLYESTER OBTAINED BY THE USE OF THE CATALYST

(75) Inventors: Brigitta Otto, Milow (DE); Eckhard Seidel, Frankfurt (DE)

(73) Assignee: Lurgi Zimmer GmbH, Frankfurt am Main (DE)

( * ) Notice: Subject to any disclaimer, the term of this patent is extended or adjusted under 35 U.S.C. 154(b) by 881 days.

(21) Appl. No.: 12/299,189

(22) PCT Filed: May 3, 2007

(86) PCT No.: PCT/EP2007/003911
§ 371 (c)(1),
(2), (4) Date: Feb. 4, 2009

(87) PCT Pub. No.: WO2007/124957
PCT Pub. Date: Nov. 8, 2007

(65) Prior Publication Data
US 2009/0312508 A1    Dec. 17, 2009

(30) Foreign Application Priority Data
May 3, 2006 (DE) .......................... 10 2006 020 558

(51) Int. Cl.
| | | |
|---|---|---|
| *B01J 31/00* | (2006.01) | |
| *C08G 63/85* | (2006.01) | |
| *B01J 31/02* | (2006.01) | |
| *C08G 63/183* | (2006.01) | |
| *B01J 32/00* | (2006.01) | |
| *B01J 21/16* | (2006.01) | |

(52) U.S. Cl.
CPC ............ *C08G 63/85* (2013.01); *B01J 2231/14* (2013.01); *B01J 32/00* (2013.01); *B01J 21/16* (2013.01); *B01J 31/0212* (2013.01); *C08G 63/183* (2013.01)

USPC ........... 502/171; 502/172; 502/216; 528/275; 528/279

(58) Field of Classification Search
CPC ...... C08G 63/85; B01J 32/00; B01J 31/0212; B01J 21/16; B01J 2231/14
USPC ................... 528/275, 279; 502/171, 172, 216
See application file for complete search history.

(56) References Cited

U.S. PATENT DOCUMENTS

| | | | |
|---|---|---|---|
| 4,277,415 A | 7/1981 | Sugarman et al. | 260/429.5 |
| 4,512,928 A | 4/1985 | Sugerman et al. | 260/410.9 R |
| 5,981,690 A | 11/1999 | Lustig et al. | 528/279 |
| 6,417,320 B1 | 7/2002 | Otto et al. | 528/279 |
| 6,489,433 B2 | 12/2002 | Duan et al. | 528/272 |
| 2004/0254330 A1 | 12/2004 | Duan et al. | 528/275 |

FOREIGN PATENT DOCUMENTS

| | | |
|---|---|---|
| CN | 1492894 A | 4/2004 |
| DE | 42 35 302 A1 | 4/1994 |
| DE | 196 27 591 A1 | 1/1997 |
| EP | 1 031 590 A2 | 8/2000 |
| GB | 864799 | 4/1961 |
| KR | 1984-0001783 B1 | 10/1984 |
| WO | WO 02/068497 A1 | 9/2002 |

OTHER PUBLICATIONS

Wypych, George. Handbook of Fillers, 2nd Edition. Toronto, ChemTec Publishing, 2000, p. 75-76. TP1114.W96.*
Derwent World Patent Index, Accession No. 2006-121323 [13], XP-002446565, Abstract of Japanese Patent No. JP2006022241.

* cited by examiner

*Primary Examiner* — Ling Choi
*Assistant Examiner* — Wenwen Cai
(74) *Attorney, Agent, or Firm* — Seed IP Law Group PLLC

(57) ABSTRACT

The present invention relates to a catalytically active composition that can be used for the production of polyesters. According to the invention, good polyester products can be obtained in this way without having to use antimony components.

7 Claims, No Drawings

CATALYST FOR THE PRODUCTION OF POLYESTER, USE OF THE CATALYST FOR THE PRODUCTION OF POLYESTER, AND POLYESTER OBTAINED BY THE USE OF THE CATALYST

CROSS-REFERENCES TO RELATED APPLICATIONS

The present application is a U.S. national stage application filed under 35 U.S.C. §371 of International Patent Application No. PCT/EP2007/003911, accorded an international filing date of May 3, 2007, which claims priority to German Patent Application No. 10 2006 020 558.8, filed on May 3, 2006, all of which applications are incorporated by reference in their entirety.

BACKGROUND

1. Technical Field

The present invention relates to a catalyst suitable for the production of polyester, use of said catalyst, and a method of production using the catalyst.

2. Description of the Related Art

The production of polyesters generally takes place by means of reacting a diol with a dicarboxylic acid or a low dicarboxylic acid ester, for example, a dimethyl ester, to form the corresponding dicarboxylic acid ester, which is polycondensed at rising temperatures and reduced pressure in a single stage or in multiple stages. Various catalysts are used for the esterification and/or the transesterification and polycondensation, depending on the selection of the diols or the dicarboxylic acids or dicarboxylic acid esters.

Generally in this process, a catalyst is used that comprises the polyvalent metal cations, which are able to form transition complexes with the functional groups, particularly with the hydroxyl terminal groups, whereby preferred metal ions for the polycondensation have three or more free valencies. Typical examples are $Sb^{3+}$, $Pb^{4+}$, $Ti^{4+}$, $Bi^{3+}$, $As^{3+}$, $Si^{4+}$, $Sn^{4+}$, $Al^{3+}$, and $Ge^{4+}$. In industrial practice, particularly for the polycondensation of polyethylene terephthalate (PET), $Sb^{3+}$ and $Ge^{4+}$ have proven satisfactory, whereby metal concentrations of 150 to 300 ppm Sb and 20 to 120 ppm Ge, depending on the type of polycondensation reactor, are effective.

Polyester products with a multiplicity of characteristics can be produced with the two metal ions mentioned above. Particularly with respect to the catalytically active component $Sb^{3+}$, however, it is detrimental that this can possibly exercise harmful influences on the environment. There has therefore been no lack of attempts to establish other metal ions as catalytically effective components, particularly ones based on Ti.

EP 1 031 590 A2 discloses a catalyst for the preparation of polyesters, as well as the production and use of this catalyst. This catalyst comprises a fine-grained and porous substrate substance, as well as a catalytically effective metal compound adsorbed in the pores of this substrate substance.

WO 02/090419 discloses a composition and a method for the production of polyester. This composition comprises a substrate substance, on which catalytically effective metal compounds are adsorbed, as well as a phosphorus-containing component.

DE 103 39 742 A1 describes a catalyst, suitable for the production of polyesters, whereby the catalyst consists of a nanoscalic inorganic oxide as the substrate material, with at least one titanium-containing compound absorbed therein.

Detrimental with regard to the use of Ti as a catalytically active metal component in catalysts for polycondensation of polyesters, however, is the high level of sensitivity to hydrolysis, for example, of the customary titanium alkoxides and the tendency towards precipitation that is inherent in compounds of this type, as well as the ability of producing colored complex compounds, which have a detrimental effect on product quality. Furthermore, catalytically effective compositions based on titanium are not able to show sufficiently high activity in the solid state during polycondensation in the manufacture of polyester, whereby this is a process step that is particularly necessary for the production of polyester materials for packaging purposes.

OBJECT OF THE PRESENT INVENTION

In view of the abovementioned disadvantages, it is the object of the present invention to specify a catalytically active composition suited to the production of polyesters, with which polyester of satisfactory quality (mechanical characteristics, visual characteristics, degree of polycondensation, etc.) can be obtained, whereby it is possible to do without the use of components containing antimony. It is furthermore the object of the present invention to provide a correspondingly improved method for the production of polyester.

BRIEF DESCRIPTION OF THE INVENTION

The object presented above is solved by the subject matter as set forth in Embodiment 1 of the present application: A composition suitable as a catalyst in the production of polyester, comprising at least one titanium compound as well as a sulphur-containing silicate. Preferred embodiments are listed in Embodiments 2-11, as follows, and in the following description. Embodiment 2: The composition of Embodiment 1, wherein two titanium compounds are contained. Embodiment 3: The composition of either Embodiment 1 or Embodiment 2, wherein the sulphur-containing silicate is an alumosilicate. Embodiment 4: The composition of any one of Embodiments 1-3, further comprising at least one substrate material with a specific surface area of 400 $m^2/g$ or more. Embodiment 5: The composition of Embodiment 4, wherein a material, selected from the group consisting of clay, activated charcoal and mixtures thereof, is used as a substrate material. Embodiment 6: The composition according to one of Embodiments 1 to 5, further comprising ethylene glycol. Embodiment 7: The composition according to any one of Embodiments 1 to 6, wherein the composition contains 1 to 30 ppm titanium. Embodiment 8: The composition according to any one of Embodiments 1 to 7, wherein the titanium compound is selected from tetra-n-butyl orthotitanate, tetra isopropyl titanate and mixtures thereof. Embodiment 9: The composition according to an one of the preceding Embodiments 1 to 8, wherein the sulphur-containing silicate and the titanium are present in the composition in a weight ratio of 1:1 to 2:1. Embodiment 10: The composition according to any one of the preceding Embodiments 1 to 9. wherein clay is present in a weight ratio of 0.5 to 2.0:1 with respect to titanium. Embodiment 11: The composition according to any one of the preceding Embodiments 1 to 9, wherein activated charcoal is present in a weight ratio of 0.01 to 0.1:1 with respect to titanium. The present invention furthermore provides a method, as defined in Embodiment 12, for the production of polyester (method for the production of polyester, characterised in that the composition of any one of Embodiments 1 to 11 is used as a catalyst composition). Preferred embodiments of this method are set forth in Embodiments 13 to 17, as follows, and in the following description. Embodiment 13: The method according to Embodiment 12, wherein the catalyst composition is added before the polycondensation state. Embodiment 14: The method according to Embodiment 12 or 13, wherein a phosphorus-containing stabilizer is furthermore used. Embodiment 15: The method according to Embodiment 14, wherein the phosphorus-containing stabilizer is dosed before, after or simultaneously with the addition of the catalyst composition. Embodiment 16: The method according to Embodiment 12, wherein the catalyst composition is used for solid state polycondensation. Embodiment 17: The method according to Embodiment 12, wherein the polyester that is to be produced is PET. The present invention finally also provides the use of the catalyst according to the invention for the production of polyester, as defined in Embodiment 18 (use of a composition according to any one of Embodiments 1 to 11 as a catalyst composition for the production of polyester), and polyester products, as indicated in Embodiment 19 (polyester comprising a composition according to any one of Embodiments 1 to 11), as well as preferred embodiments thereof, as indicated in Embodiment 20 (polyester according to Embodiment 19, wherein the polyester is PET), and Embodiment 21 (polyester according to Embodiment 19, to be used and suitable for the production of bottles, films, foils, fibrous materials and technical plastics).

Further preferred embodiments follow from the following description.

DETAILED DESCRIPTION OF THE INVENTION

The present invention is based on the surprising insight that a composition comprising at least one titanium compound and a sulphur-containing silicate is a catalytically active composition for the production of polyesters, i.e., a composition that catalyses the esterification reaction, the transesterification reaction and also the condensation reaction during the production of polyesters.

In addition to the two abovementioned fundamental components, i.e., a titanium compound and sulphur-containing silicate, the composition of the present invention can also comprise other, optional components, which are described in the following.

The composition according to the invention, as explained in the preceding, is suitable for catalysis during the production of polyesters. The present invention consequently also provides the use of the composition according to the invention for the production of polyester. Finally, the present invention also provides a method for the production of polyester, in which method the composition according to the invention is prepared as the catalyst, as well as a polyester product, comprising the composition according to the invention, i.e., at least one titanium component and a sulphur-containing silicate.

The titanium compounds already known in association with the production of polyesters can be used as the titanium component to be used according to the invention, particularly tetra alkoxides of titanium and other titanium compounds that comprise titanium in the +4 oxidation state. Preferred titanium compounds for use in the present invention are the tetra alkoxides already mentioned in the preceding, particularly tetra-n-butyl orthotitanate (TNBT) and tetra isopropyl titanate (TIPT).

The titanium component is preferably present in the composition according to the invention in a quantity such that a titanium concentration of 0.5 to 50, preferably 1 to 30 ppm titanium results, relative to the total composition according to the invention.

The composition according to the invention can comprise a titanium compound or even two or more titanium compounds. The composition according to the invention preferably comprises either a titanium compound or two titanium compounds, whereby if two titanium compounds are present, they are present in a ratio of 1:10 to 10:1 relative to one another, preferably in a ratio of 1:5 to 5:1, further preferably in a ratio of 1:3 to 3:1. A particularly preferable combination of two titanium compounds is the combination of TNBT and TIPT. It is preferred in this connection if the composition according to the invention comprises a higher proportion of TIPT; preferred in this connection are particularly ratios of 1:5 to 1:2, particularly 1:3 (TNBT:TIPT) (ratio: ppm Ti/ppm Ti).

Essential for the invention is, as already explained in the preceding, that the composition according to the invention comprises a sulphur-containing silicate. This sulphur-containing silicate is particularly preferably a sulphur-containing alumosilicate, particularly an ultramarine blue pigment. A suitable example of such a pigment is the ultramarine blue pigment Premier FRX from the company Holliday Pigments. The sulphur-containing silicate that is to be used according to the invention is preferably present in the form of a finely ground powder, particularly preferably with a particle size of 2 μm or less, more strongly preferably a particle size of 1 μm or less. This particle size specifies the permissible upper limit for the particle size of the sulphur-containing silicates to be used, i.e., all of the silicate particles to be used have, according to the invention, preferably a particle size of less than 2 μm, i.e., there are no particles present having a larger particle size. The method of determination used for this in the framework of the present invention is described below.

The sulphur-containing silicate is preferably present in the composition according to the invention in a quantity such that there is a weight ratio to the titanium in the titanium component of 0.5:1 to 5:1, preferably 1:1 to 2:1.

The composition according to the invention can also comprise other components, in addition to the fundamental components mentioned and discussed above.

In particular, the composition of the present invention preferably comprises at least one substrate material with a large specific surface area. Suitable examples of substrate materials of this kind are substrate materials in the form of microparticles or nanoparticles, preferably with a specific surface area of 400 m$^2$/g or greater, more strongly preferably 500 m$^2$/g or greater. Preferred according to the invention in this connection, on the other hand, is if the substrate material is present in the form of a finely-ground powder, for example, with a particle size of 2 μm or less, preferably 1 μm or less. This particle size specifies the permissible upper limit for the particle size of the substrate materials to be used, i.e., all of the substrate materials to be used have, according to the invention, preferably a particle size of less than 2 μm, i.e., there are no particles present having a larger particle size. The method of determination used for this in the framework of the present invention is described below.

Suitable substrate materials that can be used according to the invention are clay materials and activated charcoal. Mixtures of substrate materials, particularly mixtures of clay and activated charcoal, are also suitable according to the invention. In mixtures of this kind, however, it is preferred if the activated charcoal is used only in a very small portion, preferably in a ratio (weight ratio to the clay used) of 0.5:5 to 0.5:20, more strongly preferably 1:5 to 1:20.

With respect to the titanium component, the substrate material is preferably used in the composition according to the invention in a quantity such that a weight ratio (substrate material:titanium) of 1:4 to 4:1 results, more strongly preferably 1:2 to 2:1. If clay is used as the substrate material, a preferred weight ratio of clay to titanium lies in the range 0.5 to 2.0:1. If activated charcoal is used as the substrate material, a preferred and suitable weight ratio of activated charcoal to titanium is 0.01 to 0.1:1. This information applies to the use of a single substrate material component. If, on the other hand, a mixture of substrate materials is used, particularly a mixture as explained in the preceding of clay with activated charcoal, a preferred ratio of activated charcoal:clay:titanium component is as follows:

(0-1):(5-20):10.

The composition according to the invention can furthermore comprise additional components, such as stabilisers, suspending agents, etc. Particularly preferred is the use of a suspension agent, so that the composition according to the invention can be produced in the form of a suspension and can be dosed in during the production of polyester. Suitable suspension agents are either liquids that do not participate in the condensation reaction or also diol components, such as ethylene glycol, propylene glycol, butylene glycol, etc., that are selected depending on the desired end product. Particularly preferred in this association is ethylene glycol, particularly if the composition according to the invention is to be used as a catalyst for the production of polyethylene terephthalate (PET).

The composition according to the invention is, as explained in the preceding, suitable for the catalysis of the various process steps in the production of polyesters, comprising esterification, transesterification, and condensation. In particular, the composition according to the invention is suitable for catalysis of the condensation, whereby the composition according to the invention is also particularly suitable for use during solid state polycondensation of polyester materials for further increasing the intrinsic viscosity, in order to obtain materials that can be used in particular also in the packaging area or in the textile area.

The composition according to the invention is suitable for catalysis during the production of polyesters, particularly also for the production of polyesters for the packaging area, whereby the polyester product obtained has good color values, with low acetaldehyde content and satisfactory turbidity, and whereby furthermore the polycondensation times satisfy the industrial requirements for comparatively short reaction times (i.e., rapid progress of the condensation reaction). Surprising in this connection is particularly that the composition according to the invention, particularly the preferred embodiments described here, are capable of catalysing a sufficiently rapid condensation reaction even in the solid state, so that, in particular, it is possible to obtain polyester materials for packaging applications, for example, PET materials for packaging applications, whereby, as already explained in the preceding, satisfactory color values and turbidity levels are obtained.

In this connection, it was surprisingly ascertained according to the invention that the silicate component to be used not only positively influences the color values of the product obtained, but also has a positive influence on the required polycondensation time. It is made clear, particularly for the examples and comparative examples described in the following, that the sulphur-containing silicates to be used according to the invention lead to a surprising reduction in the polycondensation time (with regard to a desired end product, defined in the examples by a target viscosity of 0.62 to 0.63 dl/g (intrinsic viscosity)).

The use of the optional substrate materials likewise leads to a reduction in the polycondensation time, which particularly also applies to the mixtures of substrate materials, particularly the mixtures comprising clay and activated charcoal.

If a substrate material is used in the composition according to the invention, it is preferred if the catalytically active titanium component is present in an adsorbed form on the substrate material, for example, by impregnation methods such as are known in the state of the art. In this connection, EP 1 031 590 A2 is particularly pointed out, which is comprised here by reference.

All together, consequently, according to the invention a considerably improved production method for polyester is provided, which is characterised in that the composition according to the invention is used as a catalyst.

With regard to the conduct of the method during the production of polyesters, the level of knowledge of the average person skilled in the art is referred to, as well as particularly the publications EP 1 031 590 A2 and WO 02/090419, already discussed above, which are comprised here by means of reference with regard to the production method for polyester.

The composition according to the invention additionally shows no loss of activity in the titanium catalyst by means of precipitation, whereby the catalyst furthermore is also not detrimentally influenced by the presence of other customary components. One example for this is the fact that there is no interference with the catalyst system according to the invention during the production of textile polyester materials, for example, PET materials, as a result of the presence of matting agents, such as titanium dioxide. The presence of phosphorus compounds, which are used as stabilisers, such as triethylene phosphono acetate or carboxyl-ethylene phosphono acid ethylene glycol ester, has no detrimental effect on the catalytic efficiency of the composition according to the invention. As already explained in the preceding, the composition according to the invention is also highly active for the production of polyester materials for packaging applications, both in the melting and in the subsequent solid state polycondensation, and provides a clear end product with good inherent color.

The present invention is illustrated in more detail by the following examples.

EXAMPLES

Method of Determination

Intrinsic viscosity (IV): The intrinsic viscosity was determined at 25° C. with a solution of 500 mg polyester in 100 ml of a mixture of phenol and 1,2 dichlorobenzene (3:2 parts by weight) in the customary manner.

Measurement of the color values L and b was carried out according to HUNTER. The polyester chips were first crystallised in the drying cabinet at 135±5° C. for an hour. The color values were then determined by measuring, in a three-range color measuring device, the color of the polyester sample with three photo cells each preceded by a red, green or blue filter (X, Y and Z values). The evaluation was carried out according to HUNTER's formula, with the following provisions:

$$L=10\sqrt{Y}$$

$$b=7.0\sqrt{Y}-0.8467Z$$

The measurement, in nephelometric turbidity units (NTU), of the turbidity level of the polyester materials took place on a 10% by weight solution of polyester in phenol/dichlorobenzene (3:2 parts by weight) with a nephelometer from the company Hach (type XR, according to U.S. Pat. No. 4,198,161) in a cuvette with a diameter of 22.2 mm, in a manner analogous to that given in the standard DIN 38404, Part 2, that is customary for water. The intensity of the scattered light was measured in comparison to a formazine standard solution minus the value of the solvent (approx. 0.3 NTU).

The acetaldehyde content was determined by heating a polyester sample in a closed container, where the quantity of acetaldehyde in the gas area of the container was determined by gas chromatography using head-space chromatography, injection system: HS40, Perkin Elmer, carrier gas: nitrogen, column: 1.5 m stainless steel, filling: Poropack Q, 80-100 mesh, sample quantity: 2 g, heating temperature: 150° C., heating duration: 90 min.

The particle size was determined as a suspension on a HORIBA CAPA-700 centrifuge. For this purpose, one drop (approximately 0.5 ml) of the suspension to be examined was diluted in approximately 50 ml of a suitable suspending agent, then finely distributed in an ultrasound bath for roughly 10 minutes, and then, after determination and input of the temperature-dependent viscosity of the suspension that was to be examined, the grain size distribution was measured. The distribution curve, the average grain size and the maximum grain size were determined.

The specific surface area is established with the known BET method according to DIN 66131.

Examples and Comparative Examples

The base product for all trials shown in the following was a completely catalyst-free esterification product of terephthalic acid and ethylene glycol with the following analytical data:

IV 0.205 dl/g
SAP 565 mg KOH/g
AN 21 mg KOH/g
DE 96%

The saponification number SAP was determined by saponification with potassium hydroxide in n-propanol and potentiometric titration with dimethylformamide. The acid number AN of the esterification product dissolved in N,N-dimethylformamide was determined by means of photometric titration with 0.05 potassium hydroxide in ethanol solution to bromothymol blue. The degree of esterification DE was calculated from the saponification number and the acid number of the reaction mixture according to the following equation:

$$DE = (SAP - AN) \times 100 / SAP$$

Production of the Catalytically Active Composition

In example 1, tetra-n-butyl orthotitanate (TNBT) was used in the solution in ethylene glycol with 2% by weight Ti.

The production of the catalytically active compositions for examples 2 to 13 took place in conformity with the description given in EP 1 031 590, first embodiment with activated charcoal in ethylene glycol, except that a clay (40 wt. % silicon dioxide, 60 wt. % aluminium trioxide, with the trade name Siralox 40/480 from the company Sasol, with a specific surface area of 468 m²/g) was used in addition to or in place of the activated charcoal for the trials in the present application, in the ratios given in Table 1. Furthermore, the titanium component was varied (as shown in Table 2 (Ti K1=TNBT/Ti K2=TIPT)) and, in trials 3 to 12 (trials according to the invention), the ultramarine blue pigment Premier FRX from the company Holliday Pigments was additionally added.

TABLE 1

| | Contents in the ethylene glycol catalyst suspensions | | | |
|---|---|---|---|---|
| Trial No. | Ti [wt. %] | Siralox [wt. %] | Carbon [wt. %] | Premier FRX [wt. %] |
| 1 | 2.010 | 0 | 0 | 0 |
| 2 | 2.350 | 0.706 | 0 | 0 |
| 3 | 2.350 | 0.706 | 0 | 1.567 |
| 4 | 2.350 | 0.706 | 0 | 3.134 |
| 5 | 2.350 | 0.706 | 0.157 | 1.567 |
| 6 | 2.350 | 0.706 | 0.392 | 1.567 |
| 7 | 2.161 | 0.648 | 0.432 | 1.441 |
| 8 | 2.240 | 0.672 | 0.149 | 1.494 |
| 9 | 2.300 | 0.690 | 0.153 | 1.533 |
| 10 | 2.240 | 0 | 0.448 | 2.240 |
| 11 | 2.240 | 1.008 | 0 | 2.240 |
| 12 | 2.240 | 1.008 | 0.112 | 2.240 |

The particle size of the solids in the produced catalyst compositions was less than 2 μm in all cases.

Polycondensation Trials

The polycondensation batches each comprised 5,000 g of the esterification product, the specified amount of the catalytically active composition, 10 ppm phosphorus from triethylene phosphonoacetate (company: Rhodia) and the following additives:

Trials 1-9: 0.4 wt. % TiO₂ (Hombitan LW-SU from the company Sachtleben)

Trials 10-12: 1.5 wt. %. diethylene glycol and 2.0 wt. % isophthalic acid (Each of the Stated Quantities Refers to the Esterification Product)

After careful rinsing of the reactor with nitrogen, the condensation batches were melted down within 50 min. at 275° C. at atmospheric pressure. Following this, within 50 minutes, the pressure was gradually reduced to 0.1 mbar and the temperature was increased to 280° C., and then polycondensation took place. The polycondensation was interrupted after the target viscosity of 0.62 to 0.63 dl/g was reached (current consumption of the agitator was, according to a corresponding calibration, reference value with regard to the target viscosity). The polycondensate obtained was granulated and then analysed. The results are summarised in Table 2.

TABLE 2

| Trial No. | Ti K1/Ti K2 | Siralox [ppm] | Carbon [ppm] | TiO₂ [wt. %] | Premier FRX [ppm] | IV [dl/g] | Polycondensation time [min] | Color number L (Chip, cryst.) | Color number b (Chip, cryst.) |
|---|---|---|---|---|---|---|---|---|---|
| 1 | 15/0 | 0 | 0 | 0.4 | 0 | 0.630 | 109 | 86.5 | 12 |
| 2 | 15/0 | 4.5 | 0 | 0.4 | 0 | 0.622 | 101 | 87.3 | 11.2 |
| 3 | 15/0 | 4.5 | 0 | 0.4 | 10 | 0.625 | 100 | 85.8 | 7.4 |
| 4 | 15/0 | 4.5 | 0 | 0.4 | 20 | 0.629 | 96 | 83.4 | 7.0 |
| 5 | 15/0 | 4.5 | 0.1 | 0.4 | 10 | 0.621 | 98 | 86.5 | 4.6 |
| 6 | 15/0 | 4.5 | 0.25 | 0.4 | 10 | 0.623 | 94 | 82.5 | 4.7 |

TABLE 2-continued

| Trial No. | Ti K1/Ti K2 | Siralox [ppm] | Carbon [ppm] | TiO₂ [wt. %] | Premier FRX [ppm] | IV [dl/g] | Polycondensation time [min] | Color number L (Chip, cryst.) | Color number b (Chip, cryst.) |
|---|---|---|---|---|---|---|---|---|---|
| 7 | 15/0 | 4.5 | 3 | 0.4 | 10 | 0.621 | 104 | 77.1 | 3.9 |
| 8 | 3.75/11.25 | 4.5 | 0.1 | 0.4 | 10 | 0.624 | 95 | 86.2 | 4.4 |
| 9 | 0./15 | 4.5 | 0.1 | 0.4 | 10 | 0.622 | 105 | 86.3 | 4.2 |
| 10 | 2.5/7.5 | 0 | 2 | 0 | 10 | 0.623 | 131 | 74.4 | 1.7 |
| 11 | 2.5/7.5 | 4.5 | 0 | 0 | 10 | 0.625 | 97 | 81.2 | 0.2 |
| 12 | 2.5/7.5 | 4.5 | 0.5 | 0 | 10 | 0.626 | 94 | 79.2 | -0.3 |

For assessment of the conduct of the granulates in trials 10 to 12 in the solid state polycondensation (SSP), these were crystallised at 210° C. for 60 min. in a drying cabinet that had been rendered inert and then polycondensed to the solid state in a cylindrical laboratory container at 210° C. while being agitated and with a dry nitrogen current of 20 l/h. The results obtained are summarized in the following Table 3.

TABLE 3

| | Polyester after solid state polycondensation | | | |
|---|---|---|---|---|
| Trial No. | ΔIV/h [dl/g] | Turbidity [NTU] | Acetaldehyde content [ppm] | Color values L/b |
| 10 | 0.016 | 1.5 | <1 | 79.5/3.7 |
| 11 | 0.024 | 3.1 | <1 | 86.3/1.9 |
| 12 | 0.024 | 2.7 | <1 | 85.2/1.3 |

The trials and comparative trials disclosed in the present application (trials 1 and 2) clearly show the improved effectiveness of the composition according to the invention in comparison to compositions that do not contain sulphur-containing silicate. The examples furthermore show that as a result of the addition of substrate materials, it is possible to achieve further improvement, particularly improvement in the polycondensation times.

According to the invention, an improved catalytically effective system for the production of polyesters is consequently provided, by means of which polyester materials can be obtained in good quality in satisfactory reaction times, so that particularly the industrial requirements can also be fulfilled. The results of the solid state polycondensation furthermore show that compositions according to the invention can also result in very good activity in the solid state, with rates for the increase in the intrinsic viscosity of 0.015 to 0.025 dl/g per hour, wherein particularly trials 11 and 12 show very high levels of solid state activity (rates of increase from 0.021 to 0.023 dl/g per hour are seen as very good in the state of the art).

The invention claimed is:

1. A catalyst for the production of polyester, comprising: (a) a titanium component comprising at least one titanium compound; (b) a sulphur-containing silicate; and (c) at least one substrate material with a specific surface area of 400 m²/g or more, wherein the at least one substrate material comprises a mixture of clay and activated charcoal, wherein the catalyst contains the titanium component in a quantity that results in 10 to 15 ppm of titanium in the polyester produced, wherein the sulphur-containing silicate and the titanium in the titanium component are present in a weight ratio of 0.5:1 to 5:1, and wherein activated charcoal and clay are present in a weight ratio of 0.5:5 to 0.5:20.

2. The catalyst according to claim 1, wherein the titanium component comprises at least two titanium compounds.

3. The catalyst according to claim 1, wherein the sulphur-containing silicate is an alumosilicate.

4. The catalyst according to claim 1, further comprising ethylene glycol.

5. The catalyst according to claim 1, wherein the titanium compound is selected from the group consisting of tetra-n-butyl orthotitanate, tetra isopropyl titanate and mixtures thereof.

6. The catalyst according to claim 1, wherein the sulphur-containing silicate and the titanium in the titanium component are present in a weight ratio of 1:1 to 2:1.

7. The catalyst according to claim 1, wherein the activated charcoal to clay in a weight ratio of 1:5 to 1:20.

* * * * *

UNITED STATES PATENT AND TRADEMARK OFFICE
CERTIFICATE OF CORRECTION

| | | |
|---|---|---|
| PATENT NO. | : 8,846,561 B2 | Page 1 of 1 |
| APPLICATION NO. | : 12/299189 | |
| DATED | : September 30, 2014 | |
| INVENTOR(S) | : Brigitta Otto et al. | |

It is certified that error appears in the above-identified patent and that said Letters Patent is hereby corrected as shown below:

In the Claims

Column 10, Line 47, Claim 7:
"charcoal to clay in a weight ratio of 1:5 to 1:20." should read, --charcoal to clay are present in a weight ratio of 1:5 to 1:20.--.

Signed and Sealed this
Third Day of March, 2015

Michelle K. Lee
*Deputy Director of the United States Patent and Trademark Office*